United States Patent
Hanning et al.

(10) Patent No.: US 9,430,823 B1
(45) Date of Patent: Aug. 30, 2016

(54) DETERMINING CAMERA SENSOR ISOLATION

(71) Applicant: Amazon Technologies, Inc., Reno, NV (US)

(72) Inventors: Daniel Kent Hanning, Santa Clara, CA (US); Ketan Rasal, Sunnyvale, CA (US); Chang Hwa Rob Yang, Santa Clara, CA (US); Manik Gupta, Santa Clara, CA (US)

(73) Assignee: Amazon Technologies, Inc., Reno, NV (US)

( * ) Notice: Subject to any disclaimer, the term of this patent is extended or adjusted under 35 U.S.C. 154(b) by 720 days.

(21) Appl. No.: 13/915,534

(22) Filed: Jun. 11, 2013

(51) Int. Cl.
| H04N 7/00 | (2011.01) |
| H04N 17/00 | (2006.01) |
| H04N 17/02 | (2006.01) |
| G06T 7/00 | (2006.01) |

(52) U.S. Cl.
CPC .................................. *G06T 7/0004* (2013.01)

(58) Field of Classification Search
CPC ...................... H04N 7/00; H04N 17/00–17/02
See application file for complete search history.

(56) References Cited

U.S. PATENT DOCUMENTS

| 2008/0055434 A1* | 3/2008 | Ovsiannikov ...... H04N 5/36752 348/246 |
| 2008/0136947 A1* | 6/2008 | Baer .................... H04N 5/2171 348/294 |

* cited by examiner

*Primary Examiner* — Behrooz Senfi
*Assistant Examiner* — Maryam Nasri
(74) *Attorney, Agent, or Firm* — Polsinelli LLP

(57) ABSTRACT

Approaches discussed herein enable a computing device to be tested to determine whether light from an emitter is bleeding through the device, which can be indicative of an assembly failure. A light blocking member can be placed over a camera in order to prevent a camera from capturing light coming from outside the device. At least one light source of the device then can be caused to emit light, and the camera can capture at least one image to determine whether any of the light is bleeding through the device and being detected by the camera. If so, the device can be determined to fail the test, and can be sent for reassembly or another remedial action. In some cases, a type of failure might be able to be determined, and information for the failure can be logged for purposes such as quality assurance and failure rate monitoring.

20 Claims, 6 Drawing Sheets

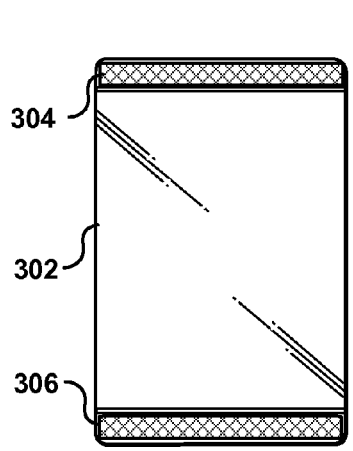
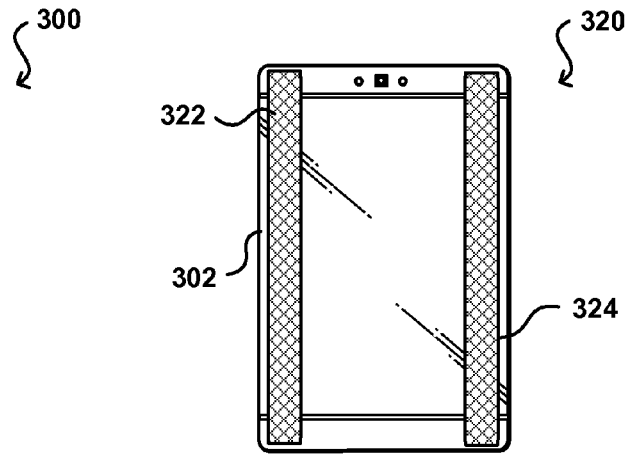
FIG. 3(a)　　　FIG. 3(b)
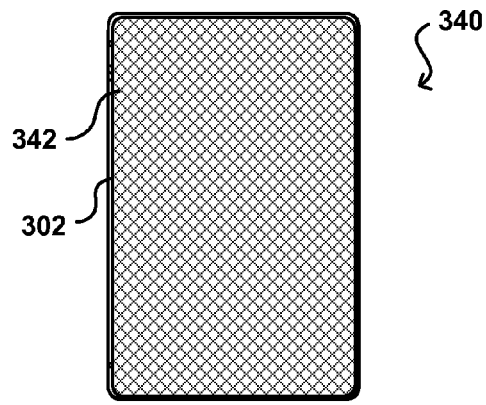
FIG. 3(c)
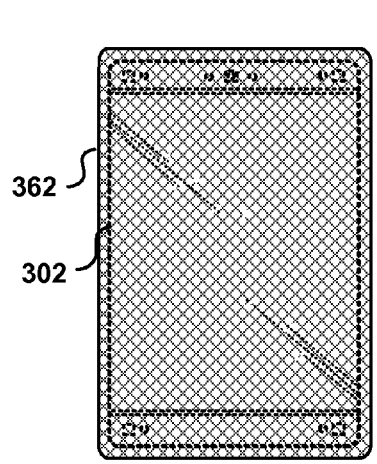
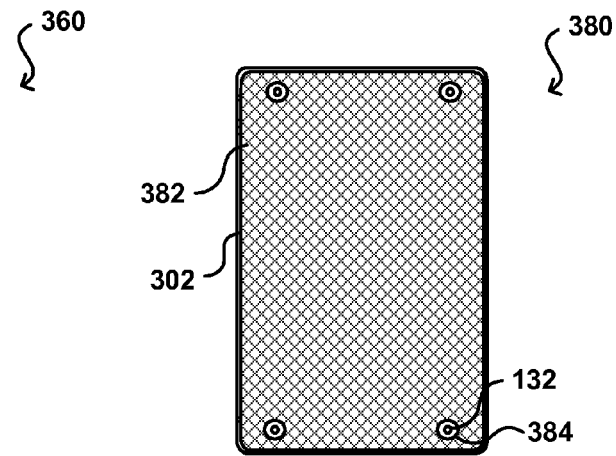
FIG. 3(d)　　　FIG. 3(e)

DETERMINING CAMERA SENSOR ISOLATION

BACKGROUND

As the functionality offered by computing devices continues to improve, users are utilizing these devices in different ways for an increasing variety of purposes. For example, certain devices utilize one or more cameras to attempt to detect motions or locations of various objects, such as for head tracking or motion input. In order to ensure that an object will be sufficiently represented in the captured image data, a computing device might also use at least one light source to illuminate the object. Problems can arise, however, when the design and/or manufacture of the device causes light from a light source to pass into the sensor through the device itself. Such light can result in artifacts that can prevent the object from being accurately identified and/or located in the captured image data.

BRIEF DESCRIPTION OF THE DRAWINGS

Various embodiments in accordance with the present disclosure will be described with reference to the drawings, in which:

FIGS. 3(a), 3(b), 3(c), 3(d), and 3(e) illustrate example sensor covers that can be utilized in accordance with various embodiments;

DETAILED DESCRIPTION

Systems and methods in accordance with various embodiments of the present disclosure may overcome one or more of the aforementioned and other deficiencies experienced in conventional approaches to managing quality of a manufactured device. In particular, various embodiments provide processes and apparatus for testing an electronic device that includes at least one light source and at least one camera, in order to ensure that light from the light source does not leak through the device to the at least one camera. For example, an infrared (IR) light emitting diode (LED) might be positioned behind a glass cover plate, or other such element, and configured to direct IR light through the glass cover plate. An IR light sensor, or camera sensor, can be configured to detect light that is reflected by an object, away from the device, and directed back through the cover glass plate. If either the IR LED or the IR light sensor is improperly installed, or if another defect is present in the device, light from the IR LED might pass through the device to the IR light sensor, without ever passing through the cover glass. Thus, the sensor can detect the light passed through the device as well as the reflected light passed through the cover glass, which can cause a captured image to be saturated, or at least show artifacts caused, by the light "leaked" through the device. In order to test for such light, various embodiments use an IR absorbing plate, or other such element, to absorb IR that passes through the cover glass from the IR LED, as well as to prevent IR from other sources from being detected by the IR light sensor. Once such a plate is in place, any IR captured by the sensor and represented in the image will likely have come from inside the device. Such an image can be analyzed and, if any IR light effects are present, the device can be designated as having a potential defect. Such processes can work for ambient or white light as well, among other such options. If a defect is detected, the device can be refurbished or otherwise reassembled to attempt to fix the defect.

Various other functions and advantages are described and suggested below as may be provided in accordance with the various embodiments.

Figure 1A:
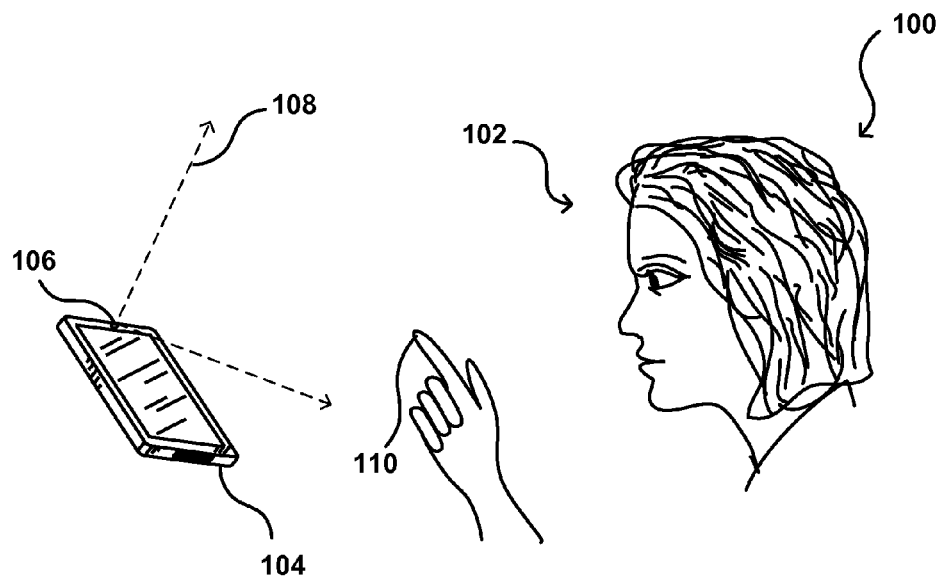
FIGS. 1(a) and 1(b) illustrate an example of a user providing input to a computing device in accordance with various embodiments.

FIG. 1(a) illustrates an example situation 100 wherein a user 102 is attempting to provide input to a computing device 104 by positioning the user's fingertip 110 in a particular location with respect to the computing device 104. Although a portable computing device (e.g., a smart phone, an e-book reader, or tablet computer) is shown, it should be understood that various other types of electronic device that are capable of determining and processing input can be used in accordance with various embodiments discussed herein. These devices can include, for example, notebook computers, personal data assistants, cellular phones, video gaming consoles or controllers, smart televisions, a wearable computer (e.g., a smart watch or glasses), and portable media players, among others. In this example, the computing device 104 has at least one image capture element 106, such as a camera or camera sensor, operable to perform functions such as image and/or video capture. Each image capture element may be, for example, a charge-coupled device (CCD), a motion detection sensor, or an infrared sensor, or can utilize another appropriate image capturing technology.

In this example, the user 102 is performing a selected motion or gesture using the user's hand 110, or is at least moving the finger towards the device to interact with the device (i.e., contact a touch screen, button, or key). If the motion is performed within a field of view 108 or angular range of at least one of the imaging elements 106 on the device, the device can capture image information including at least a portion of the user's hand and can attempt to determine the motion being performed by the user. In order for such a process to work in varying lighting conditions, the device might also use a light source to illuminate the hand. Since flashing or directing light from a white light source at a user may be distracting, and potentially power intensive, various devices might instead utilize IR light, or radiation of another such wavelength, band, or range. In this way, the IR light can be emitted as needed without being detectable by the user, and the reflected IR light can be detected by at least one camera sensor 106 of the device.

Figure 1B:
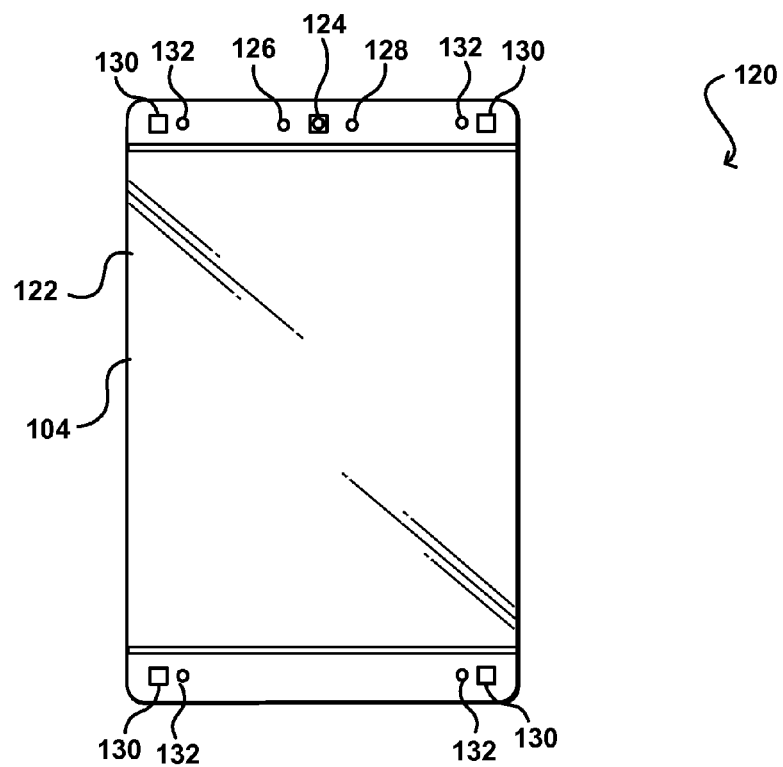

FIG. 1(b) illustrates an example computing device 120 that can be used to perform methods in accordance with various embodiments discussed and suggested herein. In this example, the device has a front-facing camera 124 (i.e., a camera on the same side of the device as a display screen 122) that can be used for purposes such as video conferencing. Along with the camera, the device can also have elements such as a light sensor 126 for determining an amount of ambient light around the device, and a white light LED 128 or other such light source capable of operating as a flash, or otherwise providing light for the front-facing camera 124. The computing device also includes four camera sensors 130, which in this example can have a lower resolution, power requirement, and/or color depth than the front-facing camera 124. Such sensors can be used for purposes such as head tracking and gesture input, for example, which can require image data to be captured over a period of time but do not require full or higher resolution images. Along with each (or at least some) of these camera sensors 130 can also be a light source, such as an IR LED 132, that can emit IR that, when reflected, can be directed back toward at least the associated camera sensor 130. Placing the LEDs near the sensors can have the advantage that objects, such as human eyes, that function as retro-reflectors can enable those objects to be detected by the adjacent sensors in the captured image data. In at least some embodiments, the distance between a camera sensor and an LED can be at least 1-2 mm. It should be understood that reference numbers for similar elements can be used within a figure, or carried over between figures, for purposes of explanation and ease of understanding, but that such use should not be read as a limitation on the scope of the various embodiments unless otherwise stated.

Figure 2A:
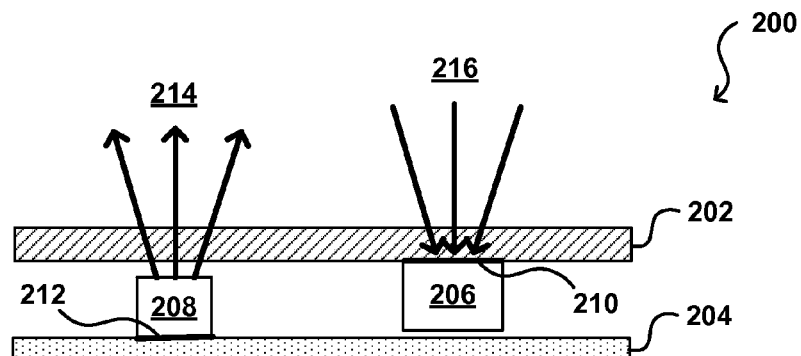
FIGS. 2(a), 2(b), and 2(c) illustrate an example situations for a computing device illustrating how light from a light source can be detected by a sensor of a computing device in accordance with various embodiments.
Figure 2B:
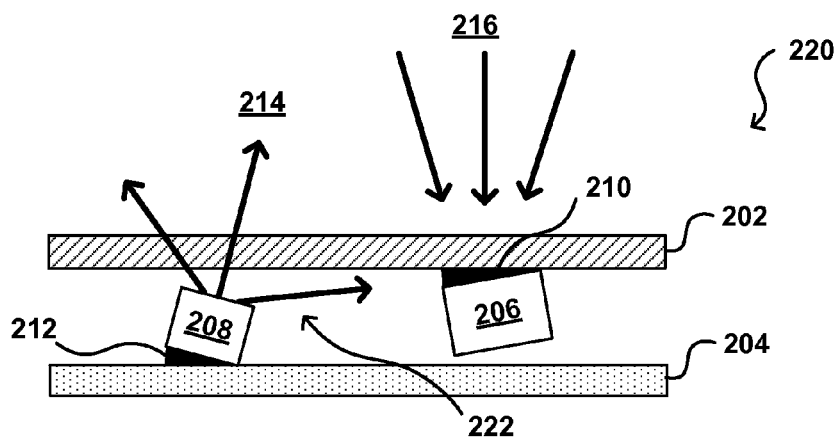
Figure 2C:
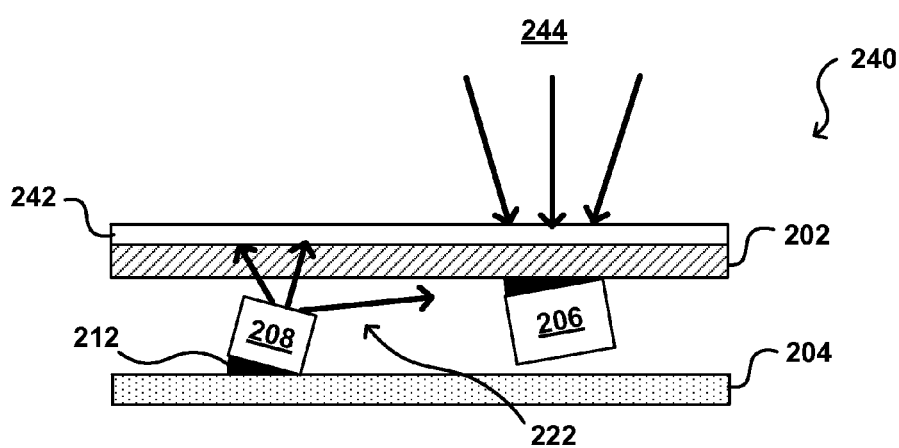

In at least some embodiments, at least a subset of the various cameras and light sources can be located "behind" a transmissive layer, such as a cover glass sheet. FIG. 2(*a*) illustrates an example cross-section 200 of one such configuration. In this example, an IR camera 206 (which in some embodiments can also capture ambient and/or ultraviolet light) is connected by an optical adhesive 210, or other such material, to a cover glass layer 202 of a computing device. It should be understood that the attachment mechanisms and arrangements are provided as an example, and that various other such mechanisms and arrangements can be used as well within the scope of the various embodiments. The device also includes an IR emitter 208 that is connected to a circuit board 212 or other such element by an adhesive 212 or other such connection mechanism. It should be understood that the IR emitter could be attached to the cover glass and/or the IR camera 206 could be attached to the circuit board or another such element within the scope of the various embodiments. Further, there are gaps included in the figure for purposes of illustration, but it should be understood that for at least some embodiments a properly assembled device would have the IR emitter substantially flush against the inside of the cover glass.

In this configuration, the IR emitter can emit IR light 214 that then can be reflected by one or more objects (not shown) and directed back towards the device as reflected IR light 216. At least a portion of the reflected IR light 216 can be received, through the cover glass layer 202, to the IR camera. The camera can then capture image data (e.g., one or more still images or video) that can be used to recognize and/or locate one or more objects within a field of view of the IR camera 206.

As discussed, however, such an arrangement can rely upon proper design and/or manufacture in order to ensure that the light being captured by the IR camera 206 is coming from outside the device, and through the cover glass, and not from the emitter through a region of the device itself. For example, the example situation 220 of FIG. 2(*b*) illustrates the fact that an improper design and/or assembly of the device can potentially result in light leaking or bleeding through the device from the IR emitter 208 to the IR camera 206. In this example, the IR emitter 208 and the IR camera 206 are each slightly misaligned, which can result from an improper application of adhesive 210, 212, an improper positioning of the emitter and/or camera, or other such manufacturing or design issues. In some embodiments, a gate or blocking element (not shown) might also be used to attempt to prevent leaking of light within the device, and such element might be misplaced, misaligned, or even missing completely in at least some instances. Any of these or various other defects can cause a portion 222 of the light 214 emitted by the IR emitter 208 to pass through the device to the IR camera 206, without ever passing through the cover glass layer 202. As mentioned, such light 222 can be captured in addition to the reflected IR light 216 passing through the cover glass sheet. The additional light can potentially saturate the camera in extreme situations, such that no object can be recognized in the image. In other cases, differing amounts of light can be detected that can create artifacts in a captured image, which can result in false positives and/or inaccurate determinations of object identity and/or position, among other such issues.

Accordingly, approaches in accordance with various embodiments utilize a light absorbing member, such as an IR-absorbing or IR-blocking plate, that can prevent a light sensor from detecting light coming from outside the device. With such a member in place, any light detected by the IR camera sensor will have come from inside the device, and thus can enable a determination of defective design, manufacture, and/or assembly of the device.

FIG. 2(*c*) illustrates an example configuration 240 that can be used in accordance with various embodiments. In this example, the IR emitter 208 and IR camera 206 are improperly aligned, as illustrated previously in FIG. 2(*b*). In this configuration, however, an IR-absorbing plate 242 has been brought into proximity (i.e., placed on or adjacent) to the cover glass layer 202 in at least the vicinity of the IR camera 206. By placing the plate in such a location, any light from the IR emitter 208 that passes through the cover glass layer 202 will be absorbed by the plate 242, and any reflected or incident IR light 244 from outside the device will be absorbed or blocked by the plate 242 as well. With the plate in place, any light detected by the IR camera 206 will have passed through the inside of the device instead of through the cover glass. Thus, an image captured by the IR camera 206 that demonstrates the capture of IR light can be indicative of a problem with the assembly of the device. In some embodiments, any intensity detected in the camera image can be used to "fail" the device during testing, but in at least some embodiments there can be a minimum amount of acceptable light to account for noise or other artifacts, such that a minimum amount of detected light might be needed before a device can be determined to fail the test.

Various types and/or configurations elements can be used to act as a light blocking member. For example, FIG. 3(*a*) illustrates a pair of thin, elongated strips 304, 306. The number, size, and shape of each of the strips can vary between embodiments and can be based at least in part on the number and arrangement of cameras to be tested. For example, if only a single camera is to be tested then a square or circle might be used in place of an elongated strip. In this example, the cover glass might have separations, paint, or other elements that can prevent light from passing through other portions of the cover glass, such as overlie the display screen, whereby a plate is only needed to block light for the portion of the cover glass overlying the cameras to be tested. Thus, in this case two elongated strips can be used to run across the "top" and "bottom" portions of the front device when in portrait orientation as illustrated in the figure. In the configuration 320 of FIG. 3(*b*), a different configuration of strips 322, 324 can be used for the same device configuration, in this case extending down the "sides" of the front of the device when in portrait orientation. Various other orientations can be used as well. Further, although elongated "strips" are discussed, it should be understood that the members can have any appropriate shapes in cross-section, such as a square, rectangle, half hemisphere, etc.

In some embodiments it can be desirable to cover the entire glass when possible. FIG. 3(c) illustrates an example configuration 340 wherein an IR absorbing plate 342 is positioned over the cover glass layer. In this example, the plate covers substantially the entire exposed portion of the cover glass. The front of the phone might have a lip around the edge in some designs, and the IR absorbing plate 342 can be sized to fit within that lip so as to lie substantially flat on the cover glass sheet (accounting for small particles or contaminants). In some instances it might be desirable to first clean or blow air on the cover glass in order to attempt to remove contaminants and/or fingerprints, to prevent light from leaking through gaps between the IR blocking plate 342 and the cover glass layer, as well as to prevent reflections from oil or other material on the surface of the cover glass. FIG. 3(d) illustrates yet another configuration 360, wherein the IR-blocking member 362 extends beyond the bounds of the cover glass. In some cases, the blocking member might have a lip or otherwise be shaped to wrap around at least a portion of the front of the device, in order to further minimize the potential for the leaking of light from under the IR blocking member. FIG. 3(e) illustrates a configuration 380 that includes openings 384, or other such features, in the blocking member 382 that can enable light from each (or at least a subset) of the emitters 132 to emit light through the openings, while still preventing light from being received to the sensors from outside the device. Such features can prevent the blocking member 382 from creating reflections at or near the interface with the cover glass layer, and ensures that any light detected by the sensor is light that leaked through the device.

Figure 4:
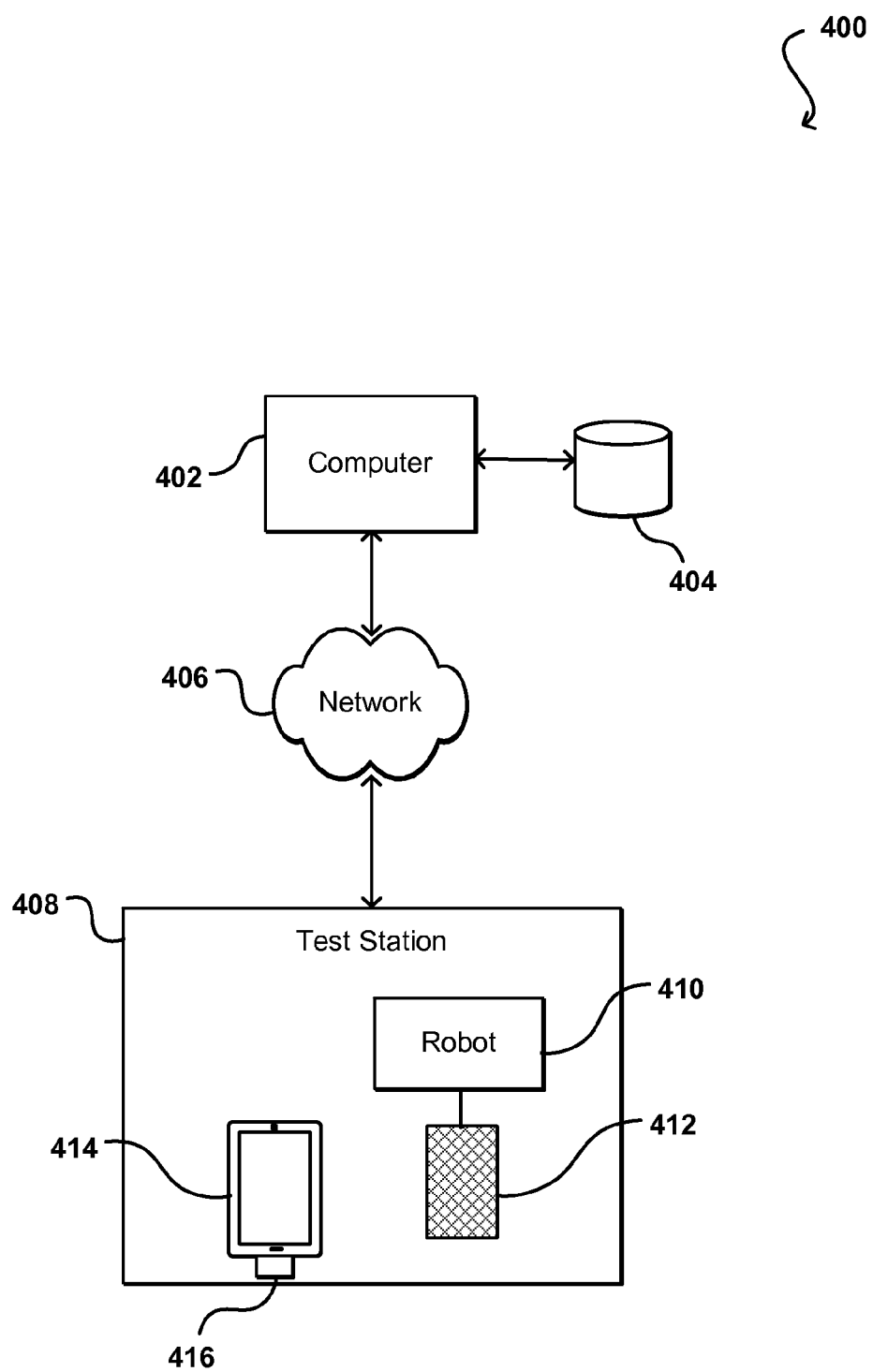
FIG. 4 illustrates an example configuration that can be used to test devices in accordance with various embodiments.

FIG. 4 illustrates an example of a testing environment 400 that can use such an IR-blocking member to test the leaking of light within a device in accordance with various embodiments. In this example, a test station 408 is provided that includes a connector 416 (e.g., USB or micro-USB) for a device 414 to be tested. The connector can provide data and/or power in at least some embodiments. The test station can comprise a bench, table, robot, or other such assembly. The test station can include at least one sensor (not shown), for example, that can indicate when a device 414 is placed in the test station 408. In some embodiments, the test station will become aware of the device being in the test station in response to the connector being connected, such as is known for USB and similar types of connections. Once a device is detected, a robot 410 or other such mechanism can cause at least one IR blocking member 412 to be positioned in the desired location with respect to the device 414. Once the IR blocking member 412 is in place, the test station 408 can send a signal across at least one network 406 (or direct connection, etc.), for example, to a computer that is operable to communicate with the device 414 through the connection. In some embodiments the computer also might be part of the test station 408.

After the blocking member is in place and the device is connected to the test station, the computer 402 can send an instruction to the device to activate at least one emitter corresponding to a camera to be tested, and can cause the camera to capture at least one image while the light is emitted. The device 414 can capture the image(s) and can analyze the data and/or send at least a portion of the data to the computer 402 for analysis. The image can be analyzed to attempt to determine whether any light (e.g., one or more flares) from the emitter was detected. For example, a value such as an intensity value, pixel value, or color value of some or all pixels or portions of the image can be analyzed to attempt to determine whether the image is substantially black, or of a similar color value, indicating that no light was detected. If any areas (e.g., quadrants) or groups of pixels have higher than a determined threshold value, in terms of intensity, pixel value, and/or color, for example, then the computer might determine that the device should fail the test, at least with respect to that sensor. The threshold value can be set to at least allow for noise in the image without returning a false positive, and in some cases can be configurable to allow for a certain amount of light or reflections, etc. Due to factors such as dead pixels and general errors it might be desirable to ignore artifacts that are only one pixel in size, as those are likely to produce false positives. In some embodiments, factors such as the size, intensity, shape, and or pattern of the detected light in the image can be indicative of different types of leakage or defect, which can be used to determine whether to fail the device, as well as what to do as a result of the failure. For example, one type of defect might indicate that a blocking fence is not present, whereby the fence can be added if possible. Similarly, if the type of defect indicates that one of the emitters or sensors is misaligned, then an attempt can be made to realign those features. Various other actions can be taken for different types of defects as well.

In one example approach to testing a captured image, an overall average intensity value for the image can be determined, or the values of the individual pixels can be examined. In some embodiments, different quadrants of the image can be examined. In some embodiments, each quadrant can be compared against a general brightness threshold to determine whether the overall brightness level is unacceptable. Each quadrant also can be compared to the relative brightness of each surrounding quadrant. If one quadrant is substantially brighter than the others, then that can be indicative of a particular type or location of the light leak within the device. More complex analyses can also be used in other embodiments.

If it is determined that the effects of light present in the image is not acceptable, a determination can be made that the device failed the test. An appropriate action then can be taken, as discussed elsewhere herein. Information for the failure, including the analyzed image or other such data, can also be stored or logged to at least one data store 404. This information can be analyzed to determine the frequency and types of errors detected, as well as to attempt to determine trends in the data and/or predict a particular type of failure in the assembly process.

Figure 5:
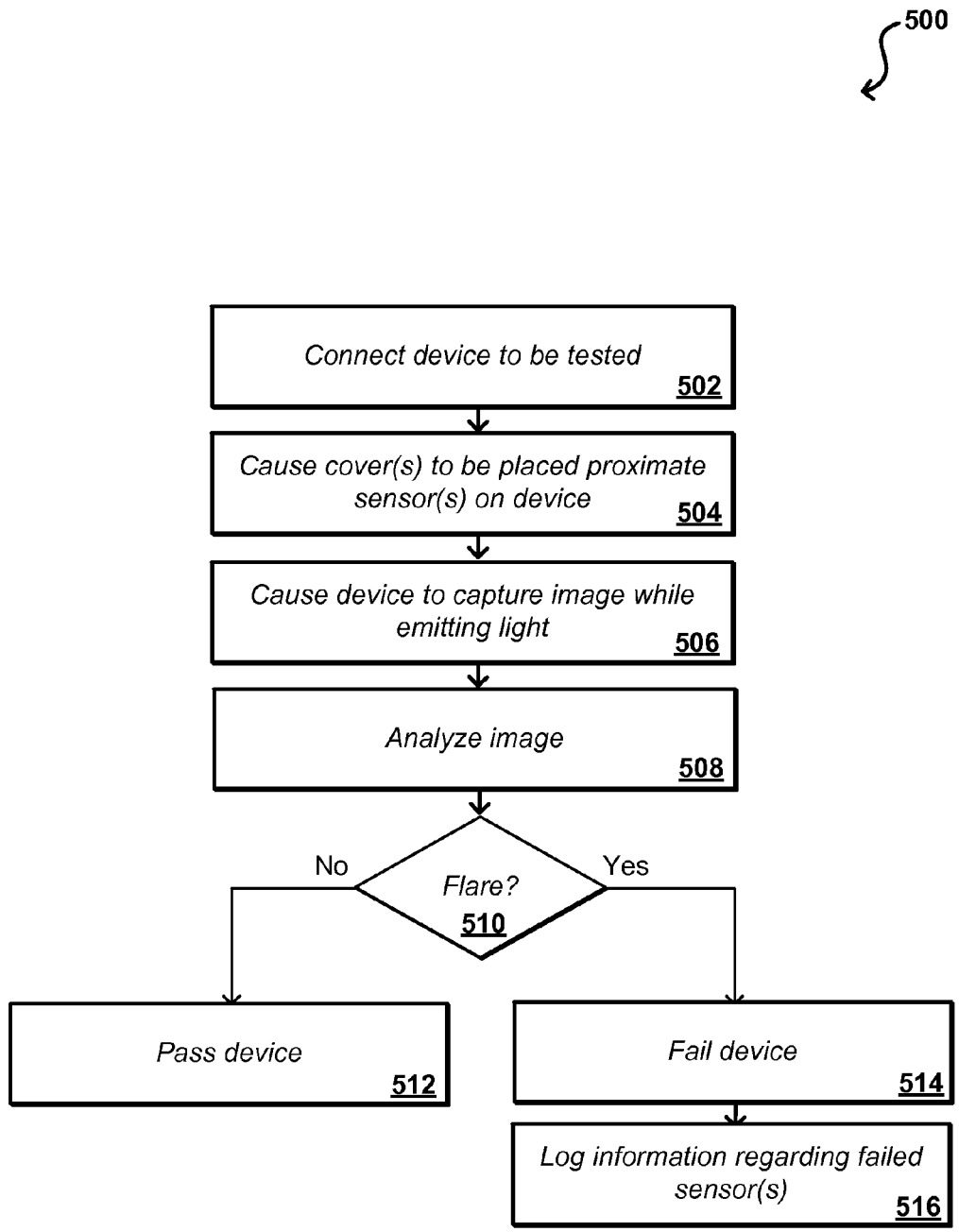
FIG. 5 illustrates an example process for testing a device that can be utilized in accordance with various embodiments.

FIG. 5 illustrates an example process 500 for testing a device for internal defects that can be utilized in accordance with various embodiments. It should be understood that, for various processes discussed herein, there can be additional, fewer, or alternative steps performed in similar or alternative orders, or at least partially in parallel, in accordance with the various embodiments unless otherwise stated. In this example, a computing device is connected 502 to the test station, or another appropriate device or system. As mentioned, this can be a physical, electrical, and/or communication connection in various embodiments. In response to the device being connected, or at least in response to the computing device being positioned in a particular location, for example, one or more light blocking covers can be placed 504 proximate to the sensor(s) to be tested on the device. As mentioned, the size, shape, number, and/or configuration of the covers can depend at least in part upon the number and/or configuration of the sensor(s) to be tested.

Once a cover is in place, a respective (e.g., proximate and co-axial) emitter of the computing device can be caused 506 to emit light, such as IR light, which should be directed out of the device, such as through a cover element, and capture an image during at least a portion of the emission. The acquired image can be analyzed 508, on the computing device, a remote device, the test station, or a combination thereof, etc. A determination can be made 510 as to whether any indication of the emitted light, such as a flare, is present in the image, as in a properly aligned device the light would have been directed so as to be absorbed by a respective blocking cover. If no light is detected, or at least no amount of light that exceeds an allowable threshold or other such criterion, it can be determined that the emitter is fully isolated from the respective adjacent sensor and the device can be determined to pass 512 the test. If the amount of light detected is determined to exceed an allowable amount or other such threshold, a determination can be made to fail 514 the device, or otherwise indicate that there may be a problem with the device. In at least some embodiments, a notification mechanism (e.g., a light, alarm, or display) can generate a notification that the device failed, while in other embodiments another robotic mechanism can cause the device to be placed in a location for failed devices (i.e., on a conveyor that will take the device to a location for reassembly). In some cases, the analysis of the image might also indicate a potential type of failure due to the size, amount, or other aspect of the representation of the light in the image. Information for the failure, including the sensor that experienced the failure, then can be logged 516 or otherwise stored for subsequent analysis.

As discussed, a light blocking member can take various forms and can be made of various materials. For example, the member can be formed of one or more layers of a plastic or polymer material such as Black ABS (acrylonitrile butadiene styrene), as well as an acrylic, vinyl, or hard foam material, among other such options. The blocking member in some embodiments can have an IR absorbing material (e.g., HA30) deposited or coated thereon, at least on the side designed to face the cover glass or other such portion of a device. The member in at least some embodiments is opaque and black to prevent external light, such as with an IR material transmittance of less than 1% at a wavelength of 940 nm. In some embodiments, the blocking member can include different layers or components, where each of those layers or components is selected to block or filter a different wavelength band, comprises a different material with different strength or rigidity, etc. A testing station in some embodiments could include different types of blocking member with different components in order to run different tests for different types of devices and/or sensors, tec.

Such a process can be used on each prototype during the development phase. During production, a subset or sampling might be tested for quality assurance. The frequency of testing may depend upon factors such as the frequency of failure and the extent or types of those failures. In some embodiments, each device might be tested where the test can be run concurrently with one or more other tests, such as to test lights, display, or input functionality.

Figure 6:
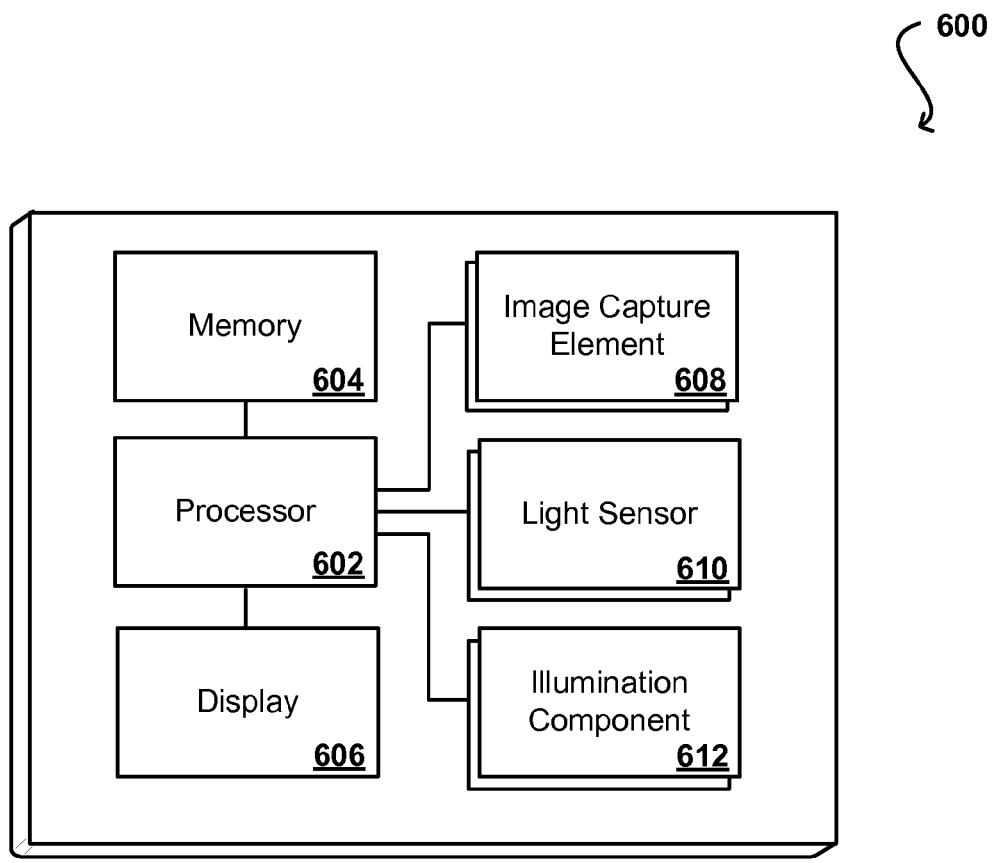
FIG. 6 illustrates an example set of basic components of a portable computing device, such as the device described with respect to FIG. 1(b).

In order to provide various functionality described herein, FIG. 6 illustrates an example set of basic components of a computing device 600, such as the device 104 described with respect to FIG. 1(*a*). In this example, the device includes at least one central processor 602 for executing instructions that can be stored in at least one memory device or element 604. As would be apparent to one of ordinary skill in the art, the device can include many types of memory, data storage or non-transitory computer-readable storage media, such as a first data storage for program instructions for execution by the processor 602, the same or separate storage can be used for images or data, a removable storage memory can be available for sharing information with other devices, etc. The device typically will include some type of display element 606, such as a touch screen, electronic ink (e-ink), organic light emitting diode (OLED) or liquid crystal display (LCD), although devices such as portable media players might convey information via other means, such as through audio speakers. In at least some embodiments, the display screen provides for touch or swipe-based input using, for example, capacitive or resistive touch technology.

As discussed, the device in many embodiments will include at least two image capture elements 608, such as two or more cameras (or at least one stereoscopic camera) that are able to image a user, people, or objects in the vicinity of the device. An image capture element can include, or be based at least in part upon any appropriate technology, such as a CCD or CMOS image capture element having a determined resolution, focal range, viewable area, and capture rate. The image capture elements can also include at least one IR sensor or detector operable to capture image information for use in determining gestures or motions of the user. The example computing device includes at least one light sensor 610 which determine the need for light when capturing an image, among other such functions. The example device 600 includes at least one illumination component 612, as may include one or more light sources (e.g., white light LEDs, IR emitters, or flash lamps) for providing illumination and/or one or more light sensors or detectors for detecting ambient light or intensity, etc.

The example device can include at least one additional input device able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual (e.g., gesture) and audio (e.g., spoken) commands such that a user can control the device without having to be in contact with the device.

The various embodiments can be implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCI, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A non-transitory computer-readable storage medium including instructions that, when executed by at least one processor of a computing system, cause the computing system to:
    determine that a computing device is positioned in a testing location, the computing device including at least an infrared emitter, configured to emit infrared light through a cover element, and an infrared camera, configured to detect infrared light reflected by an object and directed back through the cover element;
    cause an infrared blocking element to be positioned proximate the camera and the cover element, wherein infrared light from outside the device is prevented from being detected by the camera;
    cause the camera to capture an image while the blocking element is positioned proximate the camera and the cover element, and while the infrared emitter is emitting infrared light;
    analyze the image to determine whether more than a threshold amount of infrared light was detected by the camera, a presence of infrared light in the image being indicative of an assembly defect enabling light from the infrared emitter to pass through the computing device; and
    designate the computing device has having a potential defect when more than the threshold amount of the infrared light is detected.

2. The non-transitory computer-readable storage medium of claim 1, wherein the instructions when executed further cause the computing system to:
    designate portions of the image as a set of quadrants,
        wherein analyzing the image includes comparing a brightness level of at least a portion of the quadrants against a brightness threshold and against the brightness level of other quadrants of the set of quadrants.

3. The non-transitory computer-readable storage medium of claim 1, wherein the instructions when executed further cause the computing system to:

store at least one of the image or information about the image for use in tracking defects in a device assembly process.

4. The non-transitory computer-readable storage medium of claim 1, wherein the instructions when executed further cause the computing system to:
analyze at least one additional image captured by at least one additional camera of the computing device to determine whether infrared light is detected by the at least one additional camera while the blocking element is proximate the cover glass and the at least one additional camera.

5. A computer-implemented method, comprising:
causing a camera of a computing device to capture an image while a blocking element is positioned proximate the computing device, the blocking element configured to prevent light, coming from outside the computing device, from being detected by the camera;
analyzing the image to determine whether more than a threshold amount of light was detected by the camera, the detected light coming from inside the computing device; and
designating the computing device as having a potential defect in response to determining that more than the threshold amount of light was detected.

6. The computer-implemented method of claim 5, further comprising:
determining that a connection is established with the computing device; and
causing the blocking element to be positioned proximate the computing device in response to the connection being established.

7. The computer-implemented method of claim 5, further comprising:
detecting the computing device in a testing location; and
instructing a robotic element to position the blocking element proximate the computing device.

8. The computer-implemented method of claim 5, wherein analyzing the image includes determining at least one of an intensity value, a color value, or a pixel value for at least a subset of pixels of the image to determine whether a region of the image indicates that light was detected by the camera.

9. The computer-implemented method of claim 8, further comprising:
designating portions of the image as quadrants having a representative value, the representative value corresponding to the at least one of an intensity value, a color value, or a pixel value for the quadrant, and comparing the representative value for at least a portion of the quadrants against the representative values for the other quadrants and an overall intensity value.

10. The computer-implemented method of claim 5, further comprising:
causing a cover element of the computing device to be cleaned before the blocking element is positioned proximate the computing device.

11. The computer-implemented method of claim 5, further comprising:
causing at least one additional blocking member to be positioned proximate at least one additional camera of the computing device; and
analyzing at least one additional image captured by the at least one additional camera to determine whether light was detected by the at least one additional camera.

12. The computer-implemented method of claim 5, wherein the light is infrared light, and wherein the camera is capable of detecting at least infrared light.

13. A computing system, comprising:
at least one processor; and
memory including instructions that, when executed by the at least one processor, cause the computing system to:
detect a computing device positioned in a testing location;
cause a blocking element to be positioned proximate the computing device, the blocking element configured to prevent light, coming from outside the computing device, from being detected by a camera of the computing device;
cause the camera of the computing device to capture an image while the blocking element is positioned proximate the computing device;
analyze the image to determine whether light was detected by the camera; and
designate the computing device has having failed a test in response to determining that more than a threshold amount of light was detected by the camera.

14. The computing system of claim 13, wherein the blocking element is an infrared-blocking element designed to cover at least a region surrounding the camera of the computing device.

15. The computing system of claim 13, wherein the blocking element comprises at least one of a plate, a strip, a set of strips, or a partial enclosure configured to fit at least partially flush with a cover element of the computing device.

16. The computing system of claim 13, wherein the blocking element is formed of at least one of a plastic, an acrylic, a vinyl, or a hard foam material.

17. The computing system of claim 13, wherein the blocking element has a layer of infrared absorbing material disposed on at least a portion of the blocking element intended to face the computing device.

18. The computing system of claim 13, further comprising:
a robotic mechanism configured to position the blocking element proximate the camera of the computing device.

19. The computing system of claim 13, further comprising:
a connector configured to enable the computing system to communicate with the computing device, the connector further capable of providing power to the computing device.

20. The computing system of claim 13, wherein the blocking element includes at least one opening for allowing light from at least one emitter of the computing device to pass through the at least one opening.

* * * * *